Dec. 21, 1965    R. L. McKAY    3,224,253
MEASUREMENT OF THE DYNAMIC REACTANCE
PROPERTIES OF STRUCTURES
Filed Oct. 16, 1962    2 Sheets-Sheet 1

Dec. 21, 1965         R. L. McKAY                3,224,253
            MEASUREMENT OF THE DYNAMIC REACTANCE
                   PROPERTIES OF STRUCTURES
Filed Oct. 16, 1962                          2 Sheets-Sheet 2

United States Patent Office 3,224,253
Patented Dec. 21, 1965

3,224,253
MEASUREMENT OF THE DYNAMIC REACTANCE
PROPERTIES OF STRUCTURES
Robert L. McKay, Washington, D.C., assignor of forty
percent to Milton Carr Ferguson, Washington, D.C.
Filed Oct. 16, 1962, Ser. No. 230,966
5 Claims. (Cl. 73—67)

This invention pertains to the testing, measurement and analysis of structures, including artificial structures such as building foundations, abutments, completed structural frameworks and the like, and including also natural structures such as geophysical formations. The invention has for a principal object the provision of ways and means for the carrying out of such tests and measurements upon the existing structure in situ, and without the necessity for altering the construction itself or for moving it from its site or disconnecting it from structurally related parts.

The dynamic analysis of structural or physical properties by the application of known forces, and the observation of their modification after transmission or reflection through the structure, has been proposed by many previous workers. Such prior proposals have always been open to one or more practical objections, even though well-founded as to the theoretical principles involved. Thus, for example, the structural analysis of small components has been carried out in laboratories with more or less success, and individual structural components have been tested when they could be effectively isolated from disturbing environmental factors. The use of acoustic or ultrasonic "probing" waves for mechanical testing is well known, and investigations of subsurface or geophysical formations by the application of vibrations thereto is a current procedure in the art.

It is a principal object of the present invention to provide a system and apparatus for carrying out dynamic structural investigations which shall be entirely free from limitations as to the size, location or complexity of the material being tested; in other words, by equipment that is fully self-contained and essentially portable, to yield either direct indications, or recorded data from which the desired dynamic properties can later be established by known computational techniques.

In attempting to devise a system that will comply with the foregoing object, I have discovered that the problem involves considerably more than a mere conversion of the measuring and testing equipment to a portable form. The carrying out of such investigations under all kinds of field conditions, and free from the necessity of making such alterations in the surrounding conditions as would themselves cast doubt on the validity of the results, requires special techniques of testing and measurement that are themselves novel and possibly of more general application. Thus, I have found it to be essential to provide for control of both the force and frequency characteristics of the cyclically applied energy, and for the variation of those parameters over a considerable range. Moreover, I have found that it is necessary to provide for the effectively independent observation or recording of both the net reactive and the resistive forces existing within the structure being investigated, and to provide insurance that these dynamic properties of the structure are measured along a single well-defined axis direction or vector which coincides with the direction of the original force application. Otherwise, the effects of surrounding or environmental factors of no particular interest to the problem may well mask out precisely the desired and significant information which is being sought. The relation between desired and undesired information, and the necessity for separating the one from the other, is directly related in the intended manner of use of the invention for the testing of structures in situ, as above described.

Within the ambit of the general objects specified above, I propose more specifically to provide a system which is entirely self-contained and readily transportable to a site of investigations, as by a truck or like vehicle or craft. Precisely controllable power generating equipment, and output indicating and recording apparatus, will be permanently mounted within such vehicle, and connected by cables or the like to a single self-contained and entirely portable transducer unit. The cables will supply controlled input or source energy to a suitable primemover forming a part of the transducer unit, and capable of applying the cyclical energy of displacement to the structure under investigation along a single well-defined directional axis, through a vibrator whose purpose is to develop a constant applied force regardless of purposeful variations in the frequency of the probing energy, so as to yield direct values of the dynamic motional impedance. The transducer unit also includes means for applying a selected static load to the structure, via the components just mentioned, both to optimize the responses for the given structure and to maintain the transducer unit in constant energy-transfer contact with the said structure.

Furthermore, the transducer unit will include respective force and velocity output signal sensors for the purpose of reconverting the portion of the input energy reactively returned via the structure, and modified by its mechanical reactive properties, to suitable electrical signal trains for conduction into the indicating and plotting equipment at the vehicle.

The invention will permit accurately controlled measurements of structure dynamic response throughout the linear range of structure behavior and likewise determine the point of change to non-linear structure behavior and provide a novel basis for closely analysing the change of structure behavior from the linear to the non-linear mode.

The invention will best be understood by referring to the following detailed specification thereof given by way of illustration and explanation, and not for purposes of limiting the invention; said specification being read in connection with the appended drawings, in which.

Figure 1:
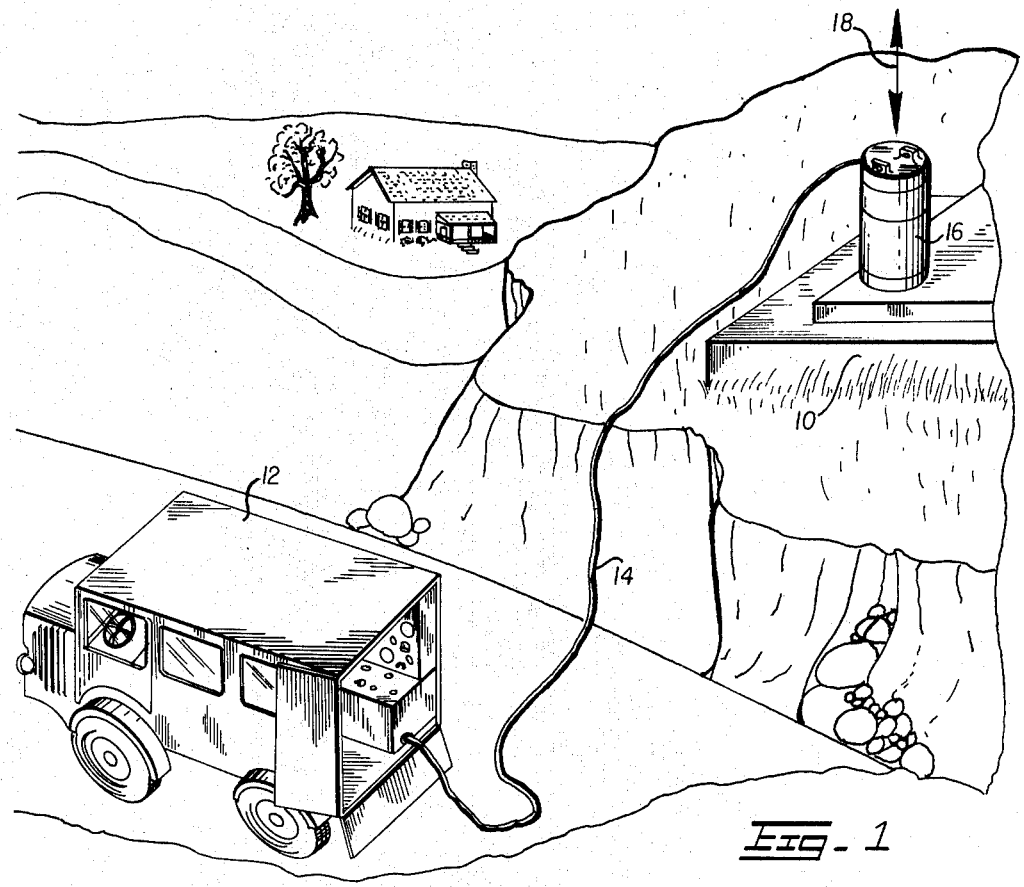
FIG. 1 is a perspective view of a typical system shown in use at a remote investigation site.

FIG. 1 of the drawings shows in schematic perspective a typical installation for in situ field testing of structural characteristics as of a pier 10 situated in a relatively inaccessible location. A field equipment truck 12 or similar vehicle is sited as close as convenient to the pier location, the truck containing the main electrical power supply, variable frequency power source or generator, and associated equipment, and the return signal processing and recording apparatus.

A cable 14 conducts the energy from variable frequency power source to the force generating vibrator within relatively portable transducer unit 16, and also conducts the return signals from the velocity-sensing and force-sensitive transducers of unit 16, all the transducers having their effective directional axes oriented on the same vertical axis 18. It is apparent that for some applications, the transducer unit 16 (which with its static load weighing may weight several hundred pounds) may be transported up to cable-length limits from truck 12 on a detachable two-wheeled carriage or dolly. Such an arrangement is especially useful for repeated measurements as at spaced points upon a road or roadbed, bridge or like structure.

While FIG. 1 illustrates the situation in which a pier 10 and its related underlying structure or subsurface are being tested, it will be appreciated that this example is merely typical. The subject matter of the test could equally well be another kind of foundation, a road or roadbed, or the like.

Figure 2:
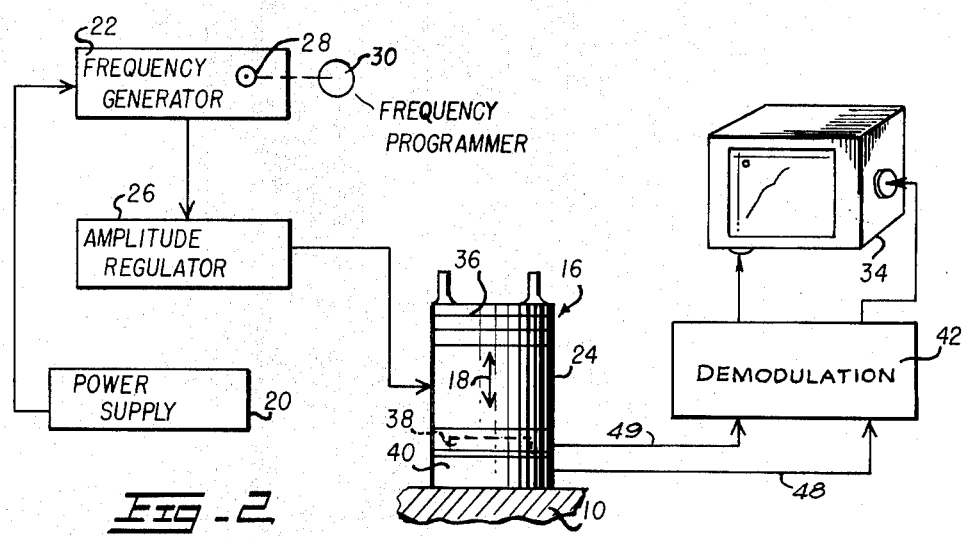
FIG. 2 is a schematic block diagram of the complete system.

A general idea of the power and signal paths during operation of the equipment is presented in FIG. 2, in which the transducer unit 16 corresponds to FIG. 1 and the labeled blocks or boxes illustrate the major components housed within truck 12. A primary power supply such as an engine generator or the like is indicated by numeral 20, shown as supplying energizing power to a variable frequency generator 22 of sufficient power capacity to energize the driving vibrator 24 of unit 16 at a suitable amplitude level throughout a specified range of frequencies. Typically, the frequency range may extend from about 5 cycles per second to perhaps a hundred cycles per second, or more.

The power output from generator 22 is shown schematically as passing through an amplitude regulator 26, which operates to control the amplitude of the driving signal supplied to drive vibrator 24 at a desired level. Depending upon the nature of the test being conducted, regulator 26 may operate to hold the electrical amplitude at a constant level over the frequency range being used, or it may be programmed in such a way as to vary the electrical amplitude concomitantly with changes in frequency, so as to maintain the mechanical force output of drive transducer 24 at a constant level.

Numeral 28 designates schematically the frequency control element of generator 22; it may be thought of as a knob or shaft connected to a tuning reactance of the generator or any other arrangement of known or convenient type by which an electronic oscillator can be adjusted in frequency. The desired repetitious or cyclical sweep in frequency is obtained by positioning this control periodically as by a program device shown in FIG. 2 as a clock drive 30. Since the cyclical repetition of the frequency sweep of generator 22 is thus directly related to the passage of time, the pilot would present the output information for each value of instantaneous frequency during such sweeps.

In any event, the drive signal from generator 22 causes periodic vertically directed oscillations of the vibrator 24 which are thus transmitted along the vertical axis to cause corresponding mechanical displacements of the structure being analyzed. To maintain continuous contact between structure 10 and the driving transducer 16, the latter will normally include static weights 36 which, together with the means represented by drive transducer 24 and other components and the casing of unit 16, establish a dead weight loading upon structure 10 about which the oscillating force acts to produce positive and negative deviations from that reference or static level.

Transducer unit 16 also includes a pair of signal sensors 38 and 40, of which the latter is disposed in force-transmitting relation between drive vibrator 24 and the test structure 10. These sensors are respectively sensitive to the velocity and the force (or acceleration) components represented by the mechanical reactance acting along the same vertical axis 18. Their output signals will thus be composites or vector combinations of the forces within the structure due to the displacement of the structure as continuously modified by the mechanical motion impedance characteristics of the body or structure 10. The treatment of these output signals is indicated in FIG. 2 by their being separately amplified if necessary and separately rectified as in circuit 42 whose electrical outputs furnish the dependently variable signals for the chart plotter 34. The plotter has independent X- and Y-axis drives as well known, the pen or like recording element thus marking the chart in a curve representing the mechanical impedance changes with frequency. Specifically, such a plot directly represents the complex ratio $(F/V)$ which defines the impedance of the structure tested.

Figure 4:
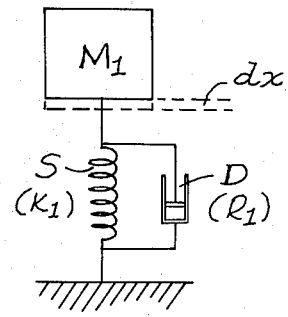
FIG. 4 is a diagram illustrating the physical relationships of the components of the system during a testing operation.
Figure 5:
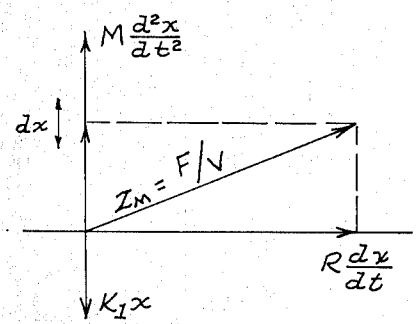
FIG. 5 is a vector diagram illustrating the analogy of an electrical system to that of the invention, for purposes of explanation.

It is well known that the mechanical properties of structures are fully comparable to the electrical characteristics of components and circuits in the latter field. Thus, in FIG. 4, which is a simplified representation of the mechanical properties of the system comprising transducer unit 16 and the test body 10, the total mass $M_1$ of the vibrator unit and its components (including the mass of the effective reactive portion of the structure undergoing analysis) is shown as supported by a spring S having a structural spring constant $K_1$ and paralleled by a structure viscous friction represented by the dashpot D having a friction constant $R_1$. The symbol $dx$ represents a small displacement of the mass $M_1$. Those skilled in the art will recognize the structural spring constant $K_1$ as the analog of the capacitive reactance component of an analogous electrical circuit; and $M_1$ as the analog of its inductive reactance component; i.e., the net value of reactance $(X_1-X_c)$ is due to the inductance and capacitance vectorially directed in opposition to one another and hence along the same vertical axis analogous to displacements $x$. The viscous friction constant $R_1$ is the analog of electrical resistance which would be plotted along an axis perpendicular to the direction of oscillation $dx$; see FIG. 5. The mechanical properties of the tested structure 10, including specifically the reactive nature (power factor or phase angle) of the structure are thus obtained, and hence its mechanical motional impedance in situ and with reference to the identical vertical direction. Since in the arrangement of FIGS. 1 and 2 we are dealing with a system whose average position is fixed, it will suffice for a complete analysis of the system to obtain readings of the structure velocity and force and to combine these readings, either directly as in a computing circuit or by recording them on the Cartesian coordinate plotter as described, to obtain a specification of the definitive mechanical reactive properties of the system.

The way in which these properties vary with variations in the frequency or velocity of displacement application is, according to the invention, the significance and variable test result to be obtained, so the system as outlined will in general completely satisfy the objects of the invention. It enables the immediate determination of the dynamic properties of the test structure as it exists in situ and along any single well-defined directional axis of greatest interest. Moreover it permits the ready separation and analysis of the mechanical properties corresponding to the elastic parameters of the structure and the inelastic or dissipative (frictional) parameters thereof.

Figure 3:
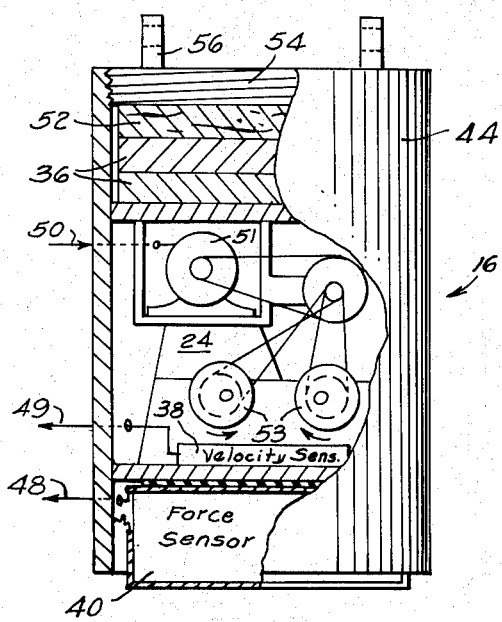
FIG. 3 is a vertical elevational view, with parts broken away and parts shown in section, of the preferred form of transducer unit employed in the system.

FIG. 3 of the drawings shows in vertical elevation the more detailed construction of a typical transducer unit 16. It embodies a rigid cylindrical casing 44 of steel or the like, whose lower end contains the force sensor 40 which will be applied to the structure under test or analysis. Within the casing the force output sensor 40 is shown as a piezoelectric transducer secured to an inner shelf of the casing 44 and having an upper electrode insulated therefrom. Its other electrode is grounded as to casing 44 and the upper electrode is connected to the signal output conductor 48. Another conductor 49 is connected to the output terminal of the velocity sensor 38. The casing shelf is surmounted by the power drive transducer or vibrator 24 energized over conductor 50 from the variable frequency generator. Vibrator 24 may comprise for example a variable speed motor 51 driving a symmetrical pair of counter rotating weights 53. At the top of the cylinder, the static loading mass is indicated by the weights 36 which may be iron or lead discs of selected number held within the cylinder 44 by an appropriate number of relatively light (wooden) spacers such as 52. The lid 54 of cylinder 44 is screw-threaded or bolted in place to maintain the other components in tight contact with one another, and is preferably provided with the lugs 56 for use in transporting this fairly massive unit.

In operation, the applied vibrator force, for a condition of dynamic equilibrium, will be $$F_a = M_1 \frac{d^2x}{dt^2} + R_1 \frac{dx}{dt} + K_1 x$$

and the right hand side of the equation represents the vectorial combination of three different forces within the structures which form the respective mechanical motional impedances. As designated in FIG. 5, $K_1$ represents the structural spring constant of FIG. 4, and $M_1$ the total mass and $R_1$ the structure friction. The forces $M_1 d^2x/dt^2$ and $K_1 x$ are reactive forces that act vertically but 180 degrees out-of-phase with one another, and $R dx/dt$ is a resistive force directed at 90 degrees to both of the reactive forces. The vector combination $Z_M$ representing the mechanical motional impedance is equivalent to force/velocity (complex ratio) and $$Z_M = \sqrt{X^2 + R^2}$$

where X is the net reactive force and R the friction force.

The dynamic impedance is defined by Firestone (Journal Acoustical Society of America, vol. IV, No. 4, 1933) in the words "the complex ratio of the applied force to the velocity induced is the impedance of the structure tested." By providing output signals instantaneously proportional to the force and velocity along the vertical axis passing through the vibrator, the invention enables the complete portrayal of changes in the structure's impedance against (that is, for all values of) the varying frequency. In a typical case, the range of applied frequencies may be from 5 cycles per second to 100 cycles per second, and a survey over such a range will ordinarily provide an output indication of a region within which the normally linear relationship between applied force and displacement can become non-linear. Further surveys, as with different frequency ranges and/or different values of static load, will explore the region of transition from linearity to non-linearity.

Suitable constructions for the vibrator 24 are shown in U.S. Patents 2,206,386 and 2,542,227 of Bernhard. However, equivalent means for applying the desired controllable force along a single well-defined axis, so as to permit the readings to be obtained as the transducer unit 16 oscillates as a part of a complete system including the specified portion of the underlying structure, will occur to those skilled in the art.

While the invention has been disclosed herein in connection with a particular embodiment of apparatus, it is to be understood that variations in the apparatus, and in details of the operational procedure, will occur to those skilled in the art; all such variations are included within the invention except to the extent limited by the scope of the appended claims.

What is claimed is:
1. Apparatus for measuring significant dynamic properties of structures, comprising:
  (a) means rigidly coupling a source of cyclical compressional displacement energy to the structure,
  (b) means for varying the cyclic operating frequency of said source through a predetermined range of frequencies,
  (c) means responsive during variation of said frequency varying means for maintaining constant the value of applied force,
  (d) means for separately measuring (1) the reactive force component, and (2) the velocity component of the displacement motion induced in said structure for varying values of said frequency, and
  (e) means for combining said components to yield the values, over said frequency range, of the complex ratio of the applied force to the velocity induced, and thereby a series of values of the mechanical motional impedance of said structure over said range of frequencies.

2. Apparatus for measuring significant mechanical properties of sub-surface structures, comprising:
  (a) means for applying directly to the surface of said structure a weighty mechanical vibrator,
  (b) means for varying the cyclic operating frequency of said vibrator through a predetermined range of frequencies,
  (c) means operative during operation of said frequency varying means for maintaining constant the value of applied force,
  (d) means for separately measuring (1) the reactive force component, and (2) the velocity component of the displacement motion induced in said structure by said vibrator, for varying values of said frequency, and
  (e) means for combining said components to yield the value, over said frequency range, of the complex ratio of the applied force to the velocity induced, and thereby a series of values of the mechanical motional impedance of said structure over said range of frequencies.

3. Apparatus for measuring significant dynamic properties of structures, comprising:
  (a) means rigidly and non-resiliently coupling a source of cyclical compressional displacement energy to the structure,
  (b) means for continuously varying the cyclic operating frequency of said source through a predetermined range of frequencies,
  (c) means responsive to variation of the cyclic operating frequency for maintaining constant the value of applied force,
  (d) means for continuously measuring (1) the reactive force component, and (2) the velocity component of the displacement motion induced in said structure for varying values of said frequency, and
  (e) means for continuously combining said components in ratio form to yield the values, over said frequency range, of the mechanical motional impedance of said structure over said range of frequencies.

4. Apparatus in accordance with claim 3, including means for continuously recording the changes in value of said impedance.

5. Apparatus in accordance with claim 3, including means for selectively adjusting the static loading force applied to said structure by said source.

References Cited by the Examiner
UNITED STATES PATENTS

| 2,206,386 | 7/1940 | Bernhard | 74—61 |
| 2,542,227 | 2/1951 | Bernhard | 74—61 |
| 2,846,874 | 8/1958 | Horn | 73—67.1 |
| 2,873,604 | 2/1959 | Samsel | 73—67.1 |

OTHER REFERENCES

Shock and Vibration Handbook (ed., Harris and Crede), vol. 1, McGraw-Hill, 1961, pp. 10–52 through 10–54. (Copy in Scientific Library, TA 355 H35.)

RICHARD C. QUEISSER, *Primary Examiner.*

JOSEPH P. STRIZAK, *Examiner.*

E. P. FORGRAVE, *Assistant Examiner.*